March 13, 1956 — L. FULLER ET AL — 2,738,374
ELECTRIC SECONDARY BATTERIES
Filed Feb. 7, 1950
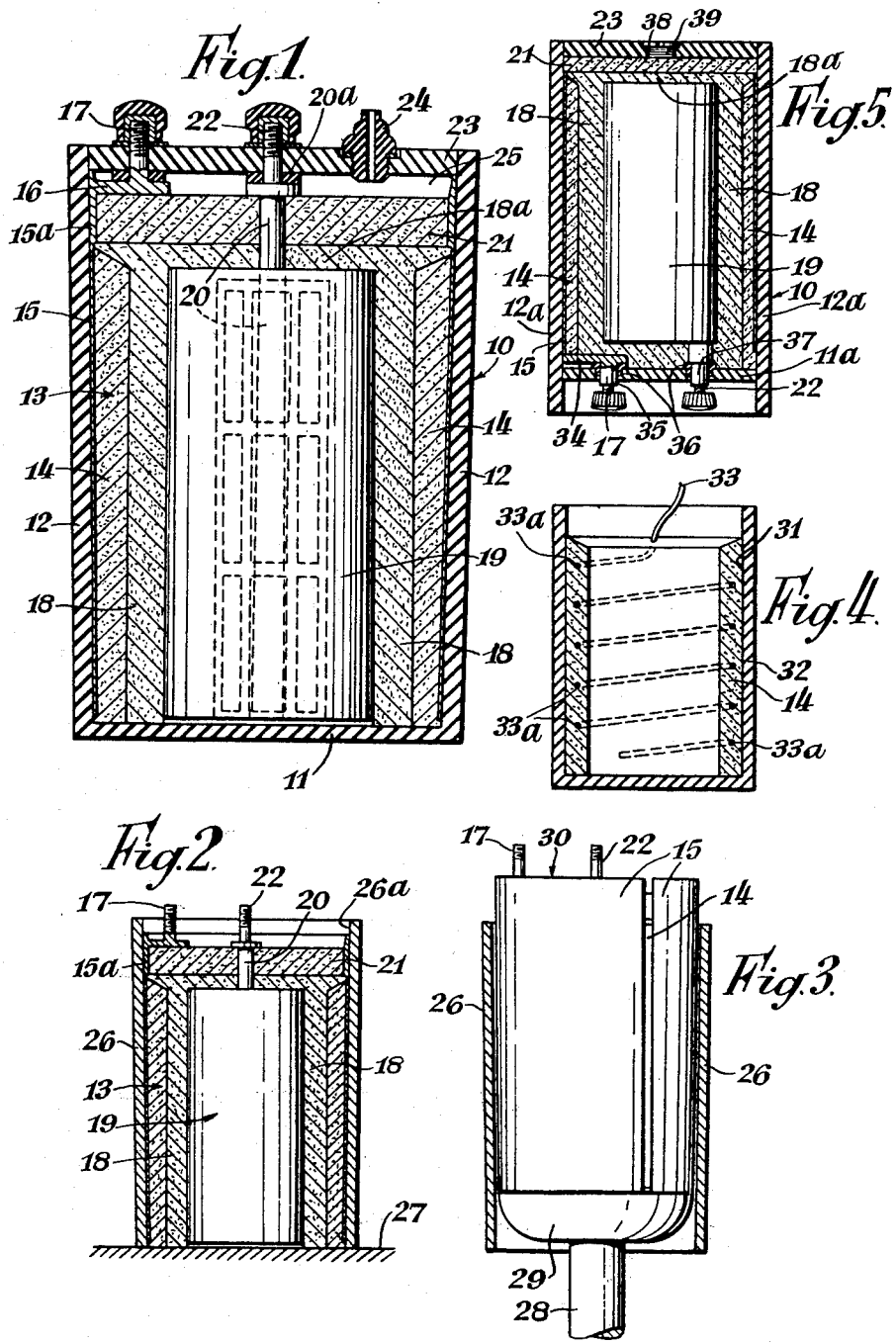
INVENTORS
Leonard Fuller &
Jonas Abraham Szper
BY
Mason, Porter, Diller & Stewart
ATTORNEYS

United States Patent Office 2,738,374
Patented Mar. 13, 1956

2,738,374

ELECTRIC SECONDARY BATTERIES

Leonard Fuller, London, and Jonas Abraham Szper, Barking, England, assignors to Varley Dry Accumulators Limited, Essex, England Application February 7, 1950, Serial No. 142,759

2 Claims. (Cl. 136—7)

This invention relates to electric secondary batteries of the lead-acid type and it has for its object to provide an improved form of construction which enables the manufacture of batteries of the concentric electrode type to be simplified. In this type of battery as used hitherto (and described for example in L. Fuller's British specification No. 437,947) a thin cylindrical container of lead, closed at its bottom, is pasted internally upon its curved wall with a layer of paste to form the negative electrode, the space within the negative electrode subsequently being occupied by the positive electrode and separating means; the lead container is usually fitted within an outer casing of ebonite, plastic or other rigid material to protect the lead container when the battery is in service. The invention provides a battery which dispenses with the lead container as such, and which is more robust, so that it is less likely to become damaged in the routine handling during manufacture. The cost of production is also reduced. More particularly the amount of metal required for a battery of given size is substantially reduced, this being very important in times when lead is scarce.

In an electric secondary battery of the character stated having concentric inner and outer pasted electrodes with the space between filled with porous separating material, the electrodes and separator forming a solid porous block containing the whole of the working electrolyte, the invention is characterised by the fact that the outer electrode comprises an open-ended tubular layer of active material, the outer surface of said electrode being in intimate engagement with the interior of a container made of acid-proof insulating material, so that said container forms substantially the whole mechanical support for the active material of said electrode. Preferably the outer electrode comprises a layer of active material coated upon the internal surface of the insulating container.

Moreover in an electric secondary battery having a container composed of acid-proof insulating material, according to another aspect of the invention said container has its internal surface coated with a layer of negative active material to form the negative electrode, said electrode being provided with an embedded conductor which serves as the negative connection of the battery.

There is further provided according to the invention an electric secondary battery comprising in combination a container composed of acid-proof insulating material, a layer of negative active material in intimate engagement with the wall of the container so as to be firmly supported thereby against expansion, a lead connection device in intimate contact with the active material to serve as the negative connection of the battery, a positive electrode disposed within the negative electrode, and separating material interposed between the positive electrode and the negative active material, the positive and negative active material and the separating material constituting a solid porous block within which the electrolyte is absorbed.

If desired, the outer electrode may include a sheet of thin lead rolled into an open-ended cylinder and positioned within the electrode so as to extend around the electrode and form a conductor and connection device therefor. Conveniently the sheet lead conductor is pasted upon its interior to form the negative electrode and fits tightly within the container. Preferably the external surface of the conductor is slightly tapered (frusto-conical) and the interior of the container is correspondingly tapered so as to ensure that the negative electrode fits snugly and intimately within the container.

The invention further provides a method of making a secondary electric battery having concentric electrodes, consisting in taking a cup-shaped jig, placing a substantially cylindrical lining of sheet lead within this, coating the interior of the lining with active material, inserting the separating material and then the inner electrode within the jig under pressure, then removing the assembly from the jig, and then forcing it into a close-fitting container which is made of acid-proof material and which intimately supports the outer electrode against swelling and bulging. The internal surface of the jig is conveniently tapered so as to make the assembly frusto-conical, and the interior of the container is correspondingly tapered to receive the assembly snugly when forced in by axial pressure.

The invention is illustrated in the accompanying diagrammatic drawings, in which:

Figure 1 is a sectional elevation through one form of completed secondary battery;

Figure 2 is a sectional elevation to show the method of manufacture, using a jig to contain the electrodes;

Figure 3 is a part sectional elevation showing the manner in which the electrode assembly is removed from the jig;

Figure 4 is a sectional elevation showing a modified form of outer electrode; and Figure 5 is a sectional elevation showing a further modified battery.

The secondary battery shown in Figure 1 has an outer container 10 which is composed of acid-proof insulating material, preferably a moulded plastic. The material known as Polystyrene has properties which make it most suitable. The container 10 is substantially cylindrical with a circular bottom 11 and a curved wall 12 which is tapered very slightly, the bottom diameter being say 0.1 inch less than the corresponding diameter at the top. This, of course, facilitates the moulding of the container and also forms a very useful advantage during the assembly of the battery as will be hereinafter apparent.

The negative electrode 13 is in the form of an annular layer 14 of active material, such as spongy lead, which relies for its mechanical support upon the curved wall 12 of the container 10, the requisite electrical connection to the active material 14 being obtained by means of a rectangular sheet of lead foil 15. This is conveniently curled into cylindrical form and is either embedded in the active material 14 or is interposed between said active material and the curved wall 12. It will be noted, however, that the conductor 15 in no way acts as a container for it has no bottom, nor are its vertical edges joined together. Along its upper edge the conductor 15 is preferably thickened as indicated at 15a so as to form a relatively robust portion which can be welded to the base 16 of the negative terminal stem 17.

Inside the layer 14 of negative active material, an annular layer 18 of porous separating material is provided, this conveniently being composed of kieselguhr. The positive electrode 19 is constituted by a mass of positive active material with an embedded conductor 20, and it completely fills the space inside the separating material. A layer of separating material is applied over the top of the positive electrode 19 as indicated at 18a and this is held in position by a disc 21 composed of porous ceramic.

The upper part of the positive conductor 20 is formed with an enlargement 20a which holds the disc 21 in place; the conductor also has a terminal stem 22.

The battery is sealed by a circular disc-like lid 23 which is composed of Polystyrene or other suitable insulating material and is cemented within the rim of the container 10. The terminal stems 17 and 22 pass through the lid 23 and the latter is provided with a vented stopper 24 in the usual manner, an air space 25 conveniently being left between the underneath of the lid 23 and the ceramic disc 21.

The electrodes 13 and 19 together with the porous separating material 18 constitute a solid block which holds all the acid electrolyte required for the proper and efficient working of the battery, this electrolyte being retained by the insulating container 10. With this arrangement a considerable reduction can be made in the amount of metallic lead which is required in the manufacture of a battery for it will be observed that the conductor 15 can be extremely thin as its mechanical strength is immaterial. The container 10 itself retains the electrode and separator block and holds it under mechanical pressure to resist any bulging or expansion that might tend to occur during the normal working life of the battery.

The improved form of battery is particularly suitable for manufacturing by economical mass production methods and one such method will be briefly described to illustrate this aspect.

Instead of assembling the various parts of the battery within its proper container 10, these parts are first assembled within a tapered tubular jig which is indicated at 26 in Figure 2. This jig has the same diameter and taper as the curved wall 12 of the container 10 but instead of having a bottom, it is arranged to rest upon a flat working surface 27. The sheet lead conductor 15 is curled into a rough cylinder and is inserted within the jig 26 and then the various parts 14, 18, 20, 19, 21, 17 and 22 are formed or assembled in stages, the positive active material 19 and separating material 18a being compressed by tamping so as to make sure that no free air spaces are left. The battery is then in the state shown in Figure 2. Due to the tapered nature of the internal surface 26a of the jig 26, the whole assembly can readily be removed from the jig 26 by applying upward pressure, say by a plunger 28 (see Figure 3) having a head 29 fitting snugly within the lower end of the jig 26.

The assembly which is indicated at 30 is then treated, say in an oven, to dry off surplus moisture, after which it is fitted into its proper acid-proof insulating container 10 and the lid 23 sealed in position. Owing to the frusto-conical tapered shape of the assembly 30 it can be readily arranged to fit tightly within the container 10, thus providing the requisite radial constraint to prevent swelling and disintegration of the electrodes.

In the somewhat modified construction shown in Figure 4, the negative active material is applied directly to the internal surface 31 of the container 32 to form the negative electrode 14. The requisite electrical connection to the negative electrode 14 is made by a lead wire 33 which extends in a helix through the active material, the various turns of the helix being indicated at 33a. The separating material and positive electrode (not shown) would, of course, be inserted in the normal manner. In this instance again the container 32 which is composed of acid-proof insulating material serves to hold electrolyte and at the same time provide the requisite mechanical support for the active material.

It will be understood that various modifications may be made in the method and form of construction. The conductor for the negative electrode may be a ring formed with depending spikes or any other shape; it is not essential for the conductor to extend over the whole area of the negative electrode as the spongy lead is a relatively good conductor. If desired a part or the whole of the surface of the container to be pasted may be sprayed or otherwise coated with a deposit of lead to form the negative electrical connection. The container can, of course, be of square or any other shape in plan, and one or both of the electrical connections can be taken through the wall of the container, as for instance by inserting a lead plug when the container is being moulded.

The invention is particularly suitable for batteries in which one or both of the positive electrical connections are taken through the bottom of the container, as the bottom is itself an efficient insulator and it is only necessary to provide a reasonably liquid-tight seal around the connections. Thus a battery may be constructed in the manner shown in Figure 5, where the positive terminal 22 and the negative terminal 17 are both disposed at the bottom of the container 10, which latter is inverted when the battery is in normal use. The container 10 is again made of acid-proof insulating material and comprises a tube 12a having a sealed-in disc 11a to form a bottom disposed a short distance up the tube, so that the bottom rim of the tube 12a forms a stand encircling the terminals 17, 22. The negative electrode comprises a layer 14 of active material and a conductor 15 as before applied to the internal wall of the tube 12a. The conductor is connected by a bar 34 with a terminal lug 35 which extends through a hole in the bottom 11, a sealing gasket 36 of rubber providing a liquid seal. A terminal lug 37 from the positive electrode 19 is arranged in a similar manner. The layer 18a of separating material extends completely across the positive electrode 19 and is held firmly in place by a porous ceramic disc 21. The lid 23 is sealed around its circumference to the upper rim of the casing 10 but in this instance is only formed with a vent aperture 38 closed by a stopper 39. During filling and charging the battery is disposed in the "upright" attitude as shown (the stopper 39 being removed), but when it is put into service the vent stopper 39 is firmly tightened and the whole battery inverted so that the terminals 17, 24 are uppermost. The negative electrode 14, 15 can be produced by pasting the interior of the casing 10, or by the separate jig method shown in Figures 2 and 3, the requisite apertures being formed in the working surface 27 and the plunger head 29 to receive the terminal lugs 35 and 37.

If desired the container can comprise a tube of insulating material closed at its lower end by an insulating seal of pitch or other material, the upper part of the tube being provided with a porous top which is pervious to gases and electrolyte, but holds the active and separating material under compression. During discharge this can be covered by a rubber or like cap, forming a flat base upon which the inverted battery can be stood.

What we claim is:

1. In an electric secondary battery, a cup-like container open at its top and having a closed bottom, a negative electrode comprising an annular layer of spongy lead closely proximate to and relying entirely for its mechanical support upon the inner wall of said container, an electrical conductor at least in part surrounding said negative electrode and comprising an extremely thin foil shaped from an initially rectangular sheet to conform to the shape of said annular layer, a positive electrode arranged in spaced relation within the negative electrode and comprising a mass of positive active material with an electrical conductor embedded therein, said annular layer of the container and said positive electrode being directly opposed to the container bottom, kieselguhr filling the space between the negative and positive electrodes and extending entirely over the top of the latter, the electrodes and the kieselguhr forming a solid block which holds all acid electrolyte required for the proper and efficient working of the battery, a porous disc closure snug within the top of the container and the foil conductor and over the top of and against the kieselguhr, a closure above the porous disc and closing the open top of the container, and positive and negative terminal members respectively connected with the positive and negative electrodes.

2. In an electric secondary battery, a cup-like container open at its top and having a closed bottom, a negative electrode comprising an annular layer of spongy lead closely proximate to and relying entirely for its mechanical support upon the inner wall of said container, an electrical conductor at least in part surrounding said negative electrode and comprising an extremely thin foil shaped from an initially rectangular sheet to conform to the shape of said annular layer, a positive electrode arranged in spaced relation within the negative electrode and comprising a mass of positive active material with an electrical conductor embedded therein, said annular layer of the container and said positive electrode being directly opposed to the container bottom, kieselguhr filling the space between the negative and positive electrodes and extending entirely over the top of the latter, the electrodes and the kieselguhr forming a solid block which holds all acid electrolyte required for the proper and efficient working of the battery, a porous disc closure snug within the top of the container and the foil conductor and over the top of and against the kieselguhr, a closure above the porous disc and closing the open top of the container, and positive and negative terminal members respectively connected with the positive and negative electrodes, the external surface of said negative electrode being slightly tapered as a frusto-cone, and the interior of the container being correspondingly tapered so as to ensure that the negative electrode fits snugly and intimately within the container.

References Cited in the file of this patent

UNITED STATES PATENTS

| | | |
|---|---|---|
| 347,259 | Starr | Aug. 10, 1886 |
| 470,792 | Root | Mar. 15, 1892 |
| 1,405,627 | Petrie | Feb. 7, 1922 |
| 1,513,913 | Kingley | Nov. 4, 1924 |
| 1,525,759 | Pernot | Feb. 10, 1925 |
| 2,120,822 | Wheat | June 14, 1938 |
| 2,176,173 | Fuller | Oct. 17, 1939 |
| 2,279,317 | Hilger et al. | Apr. 14, 1942 |
| 2,469,508 | Malki et al. | May 10, 1949 |
| 2,600,526 | Freedmann | June 17, 1952 |

FOREIGN PATENTS

| | | |
|---|---|---|
| 593,521 | Great Britain | Oct. 20, 1947 |